(12) United States Patent
Basoli et al.

(10) Patent No.: US 9,334,195 B2
(45) Date of Patent: May 10, 2016

(54) FABRICATION OF DUAL STRUCTURE CERAMICS BY A SINGLE STEP PROCESS

(75) Inventors: Francesco Basoli, Rome (IT); Silvia Licoccia, Rome (IT); Eric D. Wachsman, Fulton, MD (US); Enrico Traversa, Rome (IT)

(73) Assignees: UNIVERSITA DEGLI STUDI DI ROMA "TOR VERGATA", Rome (IT); UNIVERSITY OF FLORIDA RESEARCH FOUNDATION, INC., Gainesville, FL (US)

( * ) Notice: Subject to any disclaimer, the term of this patent is extended or adjusted under 35 U.S.C. 154(b) by 367 days.

(21) Appl. No.: 13/504,172

(22) PCT Filed: Oct. 20, 2010

(86) PCT No.: PCT/US2010/053298
§ 371 (c)(1),
(2), (4) Date: May 18, 2012

(87) PCT Pub. No.: WO2011/056418
PCT Pub. Date: May 12, 2011

(65) Prior Publication Data
US 2012/0225270 A1    Sep. 6, 2012

Related U.S. Application Data

(60) Provisional application No. 61/255,645, filed on Oct. 28, 2009.

(51) Int. Cl.
*C04B 38/06* (2006.01)
*B28B 1/14* (2006.01)
(Continued)

(52) U.S. Cl.
CPC ............... *C04B 38/0625* (2013.01); *B28B 1/14* (2013.01); *B28B 1/50* (2013.01); *C04B 38/0022* (2013.01); *C04B 38/0032* (2013.01); *C04B 38/0077* (2013.01); *C04B 2235/656* (2013.01); *C04B 2235/6562* (2013.01); *C04B 2235/6565* (2013.01); *C04B 2235/6567* (2013.01); *C04B 2235/775* (2013.01); *Y10T 428/2495* (2015.01)

(58) Field of Classification Search
None
See application file for complete search history.

(56) References Cited

U.S. PATENT DOCUMENTS 3,090,094 A    5/1963    Schwartzwalder et al.
3,833,386 A    9/1974    Wood et al.
(Continued)

OTHER PUBLICATIONS

Rainer et al, Foaming of Filled Polyurethanes for Fabrication of Porous Anode Supports for Intermediate Temperature-Solid Oxide Fuel Cells, Journal of the American Ceramic Society, vol. 89, Issue 6, pp. 1795-1800, May 11, 2006.*
(Continued)

*Primary Examiner* — Benjamin Schiffman
(74) *Attorney, Agent, or Firm* — Saliwanchik, Lloyd & Eisenschenk

(57) ABSTRACT

The subject invention discloses a method for the preparation of a dual structure cellular ceramic object where a dispersion of a ceramic precursor a chain-growth or step-growth polymer precursor and a solvent is heated to a first temperature at a first rate followed by heating to a second temperature at a second rate and holding the temperature to form a sintered dual structure cellular ceramic object which is then cooled at a third rate to room temperature. The dual structure cellular ceramic object has a dense surface layer over at least a portion of the object that abruptly yet smoothly and continuously transitioning into a porous ceramic.

12 Claims, 2 Drawing Sheets

(51) Int. Cl.
*B28B 1/50* (2006.01)
*C04B 38/00* (2006.01)

(56) References Cited

U.S. PATENT DOCUMENTS 4,670,304 A    6/1987  Miura et al.
2002/0037799 A1*  3/2002  Li et al. .................... 501/82

OTHER PUBLICATIONS

Wucherer et al, Synthesis and Characterization of BaTiO3-Based Foams with a Controlled Microstructure, International Journal of Applied Ceramic Technology, vol. 6, Issue 6, pp. 651-660, Oct. 29, 2008.*

Studart et al, Processing Routes to Macroporous Ceramics: A Review, Journal of the American Ceramic Society, vol. 89, Issue 6, pp. 1771-1789, May 11, 2006.*
Xia et al, Microstructures, conductivities, and electrochemical properties of Ce0.9Gd0.1O2 and GDC—Ni anodes for low-temperature SOFCs, Solid State Ionics, vols. 152-153, Dec. 2002, pp. 423-430.*
Colombo, P., "Conventional and novel processing methods for cellular ceramics," *Phil. Trans. R. Soc. A*, 2006, pp. 109-124, vol. 364.
Li, Q. et al., "Single-step fabrication of asymmetric dual-phase composite membranes for oxygen separation," *Journal of Membrane Science*, 2008, pp. 11-15, vol. 325.
Sepulveda, P. et al., "Evaluation of the in Situ Polymerization Kinetics for the Gelcasting of Ceramic Foams," *Chem. Mater.*, 2001, pp. 3882-3887, vol. 13.
Shin, Y. et al., "pH-Controlled Synthesis of Hierarchically Ordered Ceramics with Wood Cellular Structures by Surfactant-Directed Sol-Gel Procedures," *J. Ind. Eng. Chem.*, 2003, pp. 76-82, vol. 9, No. 1.

* cited by examiner

FABRICATION OF DUAL STRUCTURE CERAMICS BY A SINGLE STEP PROCESS

CROSS-REFERENCE TO RELATED APPLICATIONS

This application is the U.S. national stage application of International Patent Application No. PCT/US2010/053298, filed Oct. 20, 2010, which claims the benefit of U.S. Provisional Application Ser. No. 61/255,645, filed Oct. 28, 2009, the disclosures of which are hereby incorporated by reference in their entireties, including any figures, tables, or drawings.

BACKGROUND OF INVENTION

Cellular ceramics are materials with a high level of porosity that exhibit an enclosed empty space with faces and solid edges. The faces can be fully solid to give a closed cell material or faces can be voids to give an open cell material. Pores can reside in the cell walls, or the material can have a mixed morphology of closed and open cells. Cellular ceramics can display a unique combination of properties, including: high temperature and environmental stability; low density: low thermal conductivity; low dielectric constant; low thermal mass; high specific strength; high permeability; high thermal shock resistance; high porosity; high specific surface area; high wear resistance; high resistance to chemical corrosion; and high tortuosity of flow paths. These properties make them highly valuable for various engineering applications including: filtration of molten metals or of particulates from exhaust gases; radiant burners; catalyst supports; biomedical devices; kiln furniture; reinforcement for metal or polymer matrix composites; bioreactors; fiber-free thermal management components; supports for space mirrors; lightweight sandwich structures; heat sinks; electrodes; heat exchangers: and components in solid oxide fuel cells (SOFC).

The properties stem from the porosity where a specific material property can be achieved by the choice of material and the fabrication method employed to achieve the porosity. The fabrication method influences the type of cell, the size and shape distribution of the cells, and the interconnectivity of the cells and can limit the shape and size of the ceramic part. Performance and properties depend on the macro- and microstructure of the cellular ceramic component. The nature and distribution of the cell walls influences permeability and strength. Compositional purity affects chemical and oxidation resistance, high-temperature creep, electrical resistivity and thermal properties. The compositional purity also depends strongly on the processing method. The fabrication method also has a large influence on the cost of the material and some are only suited toward high performance, high added value products. Generally, three different methods have been used to form most ceramic foams: replication of a sacrificial foam template; direct foaming of a slurry; and pyrolysis of fugitive pore formers.

The majority of ceramic foams are fabricated industrially using a replication process to form reticulated ceramics with open-cells of voids surrounded by a web of ceramic struts. The replication process was the first developed for manufacture and produces a macroporous ceramic body (see Schwartzwalder el al. U.S. Pat. No. 3,090,094). This process involves, impregnating a flexible polymeric foam with ceramic slurry, removing excess slip by squeezing or centrifuging, drying with the burn-out of the polymer template and finally sintering at high-temperature. The organic foam must possess reproducible properties, such as shape memory upon squeezing, limited tolerances of cell size and size distribution, and must completely burn-out during sintering. The ceramic slurry can employ a wide variety of oxides and non-oxides and can include binders, rheological agents and/or setting compounds to facilitate coating and/or improve adherence of the ceramic particles to the polymer template. The ceramic struts are generally hollow.

A uniform unfired coating on the polymer template and complete removal of excess ceramic slip before firing is critical to avoid closed cells in the final porous ceramic. Firing must be conducted at an appropriate rate during polymer burn-out to avoid creating stresses and large defects in the ceramic. During heating, the expansion and gas evolution of the polymer can generate stresses that damage the ceramic coating if heating is not carefully controlled. Ceramic struts containing macroscopic flaws are often observed in commercially available cellular ceramics.

The direct foaming method involves generation of bubbles inside a slurry of ceramic powders or inside a ceramic precursor solution to create a foam which is subsequently set to maintain a porous morphology and finally sintered at high temperature. The foaming agent is a volatile liquid, such as a low boiling point solvent, a decomposable solid, such as $CaCO_3$ powder, or a gas that is generated in situ by chemical reactions, such as that generated during thermal decomposition of a silicone resins, oxidation of a solid C or SiC filler to form $CO_2$, or can be added by gas injection.

The foam's morphology depends on concurrent development and stability of the liquid foams. Drainage of the liquid or suspension through the cell edges occurs until an equilibrium state is reached. The foam is coarsened by gas diffusion among bubbles leading to a relatively large dispersion of cell sizes as well as to the increasing of the average cell size with any delays during processing. Ultimately the liquid film can rupture and the foam can collapse. To avoid collapsing of the liquid foam and loss of the cellular morphology, special additives are included to harden the foamed structure once it is stabilized. Setting strategies that have been used include polymerization of an organic monomer to stabilize foams from aqueous ceramic powder suspensions, clotting of protein or ovalbumin binders, gelling due to enzymes, starch, cellulose derivatives or alginates, cross-linking of polyurethane precursors, or freezing. For example, Wood et al, U.S. Pat. No. 3,833,386 use polyurethane network precursors mixed with an excess of aqueous ceramic slurry which is foamed and then sintered at high temperature to produce the cellular ceramic. Surfactants can be used to achieve control of the foam structure. The ceramic foams obtained by direct foaming are ultimately dried and sintered by conventional means.

Foams formed by direct foaming differ from foams obtained by a replica technique in that both closed and open-cell form, generally a wider range of cell dimensions results, cell dimensions are generally limited to smaller cells due to liquid foam stability limitations, and wider range of porosity can be achieved. These materials typically display cell walls containing interconnecting pores which leads to a different permeability behavior than those displayed by reticulated foams that allow a finer adjustment of fluid transport within the structure. Ceramic struts are dense and possess a limited amount of defects which lead to improved mechanical strength. With direct foaming techniques, one can produce many shapes of the final ceramic part without subsequent machining. Cellular materials produced by direct foaming can display unwanted anisotropy in the structure, due to differing expansion in the rise direction versus the lateral directions during foaming.

Burn-out or decomposition of fugitive pore formers is another method for producing cellular ceramics. Hollow cells are produced when the solid material that occupies volume within the mixture decomposes during heating at high temperature. Starch, wax, polymeric beads, for example, poly (methyl methacrylate), polystyrene, and poly(vinyl chloride), carbon black, and sawdust have all been used as fugitive pore formers. Pore size and shape is controlled by the characteristics of the sacrificial filler. Graded structures can be obtained by layering fillers of varying dimensions. In order to produce a highly porous cellular structure, a large volume of the porogen agent must be mixed with the ceramic phase which leads to the development of a large amount of gas during sintering and can lead to the formation of cracks in the ceramic body. Fugitive pore formers can lead to cellular ceramics and form closed or open cells depending on the volume fraction of pore formers and the nature of gas generation.

In addition to the porous ceramic body, a dense ceramic surface layer may be desired in order to obtain a maximum mechanical strength and/or to enable a directed fluid flow through the ceramic object. The formation of a dual structure, where a dense layer, for example a dense surface, yields to a porous structure without a discontinuous interface between the porous and dense layers has been prepared with few processing steps. For example, Miura et al. U.S. Pat. No. 4,670,304 discloses the impregnation of a foam with a ceramic slurry, followed by centrifugation of the impregnated foam to force a portion of the slurry to the exterior of the foam, followed by drying, baking and sintering to form a dual structure. The preparation of a dual structure ceramic without steps of impregnating and centrifugation would be advantageous for devices employing a dual structured ceramic.

BRIEF SUMMARY

Embodiments of the invention are directed to methods for the manufacture of ceramic foams that have dual structure. Dual structure cellular ceramic can be formed by dispersing a ceramic precursor with a surfactant in a mixture with a chain-growth or step-growth polymer precursor to form a dispersion; raising the temperature to burn out a formed polymer; further raising the temperature so as to form the sintered structure; and lowering the temperature sufficiently slowly to avoid cracks upon cooling. In some embodiments, the ceramic object is formed by use of a mold or by extrusion of the dispersion through a die. The dual structure ceramic displays at least a portion of the surface that is a very dense layer situated upon an open cell porous body. The dense layer abruptly, yet smoothly and continuously, transitions into the open cell porous structure.

Advantageously, the disclosed method is easy and reliable. The method avoids the need for complicated and expensive design as is common of state of the art methods to create a dual structure porous-dense system as the dual structure is created by a simple fabrication step and a simple thermal treatment. Morphology of the resultant ceramic is readily controlled and modified during the foam formation and thermal treatment.

Other aspects and advantages of the subject invention as well as a more complete understanding thereof will become apparent from the following detailed description, taken in conjunction with the accompanying figures, illustrating by way of example the principles of the invention.

DETAILED DISCLOSURE

Figure 1:
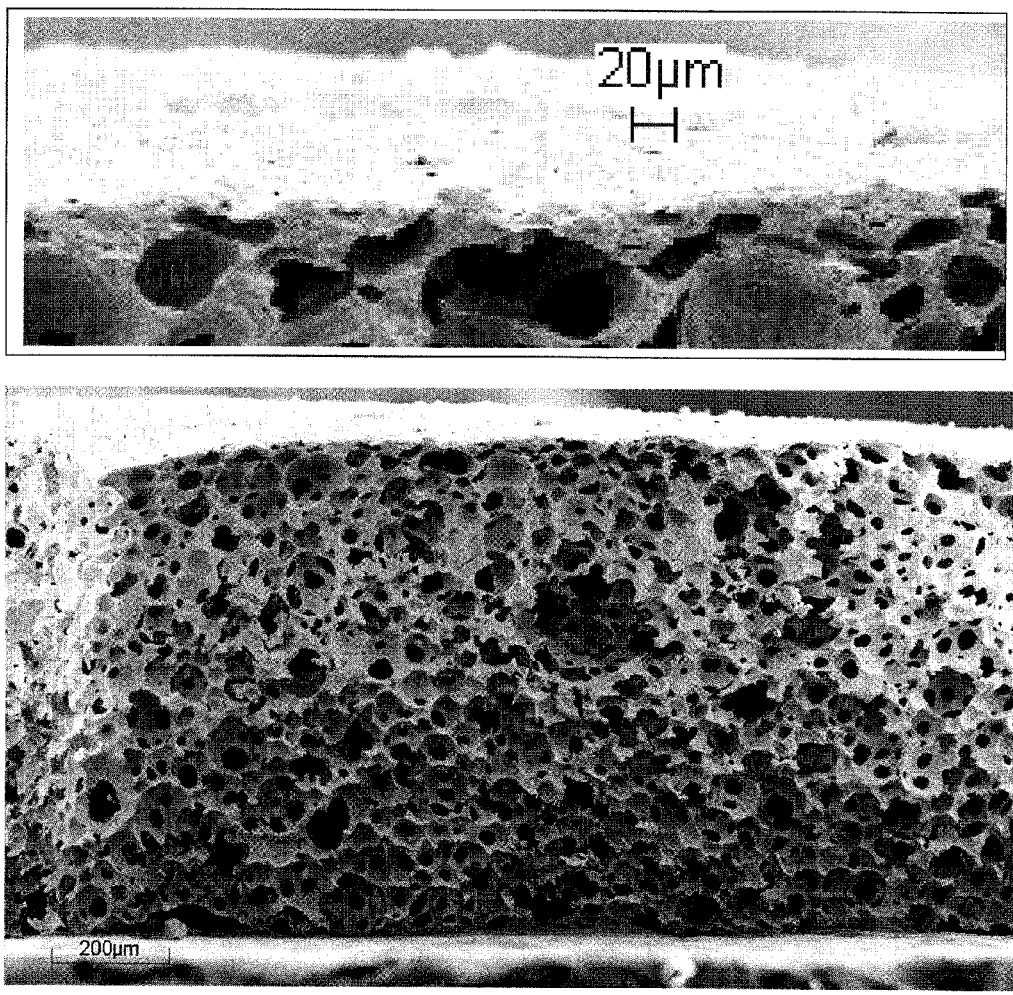
FIG. 1 shows SEM images of: a) a cut surface of a dual structure gadolinia doped ceria (GDC) cellular ceramic according to an embodiment of the invention; and b) magnification of the surface in the vicinity of the dense surface that illustrates how abruptly the structure transitions from dense to highly porous.

Embodiments of the invention are directed to a method of preparing a cellular ceramic object that has a dual structure. The dual structure object has an open cell porous structure of high porosity that extends to a thin surface layer of the same chemical composition that is dense, displaying no porosity or only a small fraction of the porosity of the porous structure immediately adjacent to the surface layer. The dense surface layer can enclose some or all of the highly porous material of the ceramic object. The dual structure ceramic object can have a variety of different shapes, where the shape is defined by the manner in which the porous ceramic object is formed and sintered. For example, in one embodiment of the invention the object can be formed in a mold, where the shape of the object is defined by the shape of the mold.

The mold can be made from metal, glass, ceramic or polymeric materials. In the case of polymeric molds, different polymers such as polyethylene (PE), polypropylene (PP) or polystyrene (PS) can be used. The mold can have various shapes depending on the desired shape of the final fabricated structure and on the stiffness of the material which the mold is composed. The use of a rigid mold increases the possibility of cracks in the de-molding process and thus can limit the complexity of the fabricated structure. Semi-rigid or flexible polymeric molds give the possibility of designing more complex structures. The dense surface layer is generated adjacent to the mold, but does no extend, necessarily over the entire surface of the demolded dual structure ceramic object, as can occur in a mold that has one surface open to the atmosphere. In another embodiment of the invention, the dual structure ceramic object is extruded through a die which gives the object its shape, with the portion of the surface in contact with the die forms the dense ceramic surface layer around a core of porous ceramic. One or both of the end surfaces of the extruded object can be free of the dense porous structure. The dual structure ceramic object can be cut or otherwise machined, for example by cutting or grinding to remove some portion of the dense surface as desired. Hence, according to an embodiment of the invention, a dual structure cellular ceramic has at least a portion of one surface that has a dense surface layer with a relatively modest thickness of high density that smoothly and continuously, yet rather abruptly, transitions into an open cell porous structure.

The pore diameter varies from 2 to 100 micrometers. The porous structure is open, with the pores connected to each other. The dense layer on top of the porous structures is 1 to 20 micrometers in thickness.

The process involves providing a dispersion of a particulate ceramic precursor at 30 to 80 weight percent, depending on the type of ceramic and the surface area of the powder used, in a mixture of a solvent and one or more chain-growth or step-growth organic polymer precursors. As needed, catalysts, initiators, dispersing agents, binders, pore formers, and/ or pigments can be included. The dispersion as initially prepared and handled is generally a highly viscous fluid. Initial polymerization occurs as soon as the chemicals interact, increasing the viscosity.

In a first stage, the temperature is raised to a first temperature during which the polymer is formed is completed as necessary and subsequently decomposed. During a second stage, the temperature is raised to a second temperature, where sintering occurs to form a desired sintered structure. The rates of heating during the two stages can be the same or different and the temperature increase in the two stages can be steady, accelerating or de-accelerating, as needed to achieve the desired ceramic structure. After the ceramic is sintered, the system is cooled sufficiently slowly to room temperature to avoid cracks. The heating of the ceramic containing mixture can be performed in an atmosphere of air, an inert gas, or a vacuum.

In one embodiment of the subject invention, the dispersion is prepared in or transferred to a mold after initial polymerization, where the mold has the shape of the desired product, and subsequently is treated thermally. In another embodiment of the invention, the dispersion, after initial polymerization, is extruded through a die where the extruded body can be held in an oven where the temperature is raised in a prescribed fashion or travels through heated path having a gradient of temperatures that occurs in either a continuous manner or has discrete sections at desired temperatures. The shape of the die can vary to give any desired shape for the extruding object and is not limited to a cylinder with a circular cross-section. The cross-section and length of the die can vary within reasonable limits established by the rate of heat transfer across the ceramic material and the rate of extrusion.

The rate of heating of the ceramic object is controlled, for example at 30° C./hr to 120° C./hr until the first temperature, for example from 350° C. to 800° C., is achieved followed by heating to a second temperature, from 1100° C. to 1700° C., at a second heating rate that may be the same or different than the first heating rate, normally between 30° C./hr to 240° C./hr. The rate of heating can be accelerating or de-accelerating as necessary to achieve a desired structure. For purposes of the invention, decomposition can occur by reaction with oxygen or some other oxidizing agent for the polymer, or can occur without any oxidation or combustion but can occur by any bond breaking and formation processes that can occur thermally. If desired, the heating can be carried out in an inert atmosphere, for example under nitrogen or a noble gas. The maximum temperature achieved upon heating can be maintained for any desired period of time, for example no dwell to 600 min. The cooling rate is sufficiently slow to avoid structural cracks of the dense surface layer, for example, the dual structure ceramic can be cooled at a rate of −0.5° C./min to −4° C./min.

The ceramic precursor can be, but is not limited to, alumina, aluminum nitride, boron carbide, ferrites, silicon, silicon carbide, silicon nitride, zinc oxide, cerium oxide or ceria, gadolinia doped ceria (GDC), europium oxide, and tin-doped indium oxide, zirconia, yttria-stabilized zirconia (YSZ), NiO—YSZ, $BaTiO_3$, $Nb_2O_5$, CoO, $MnCO_3$, hydroxylapatite, $LaGaO_3$, $La_2Mo_2O_9$, $La_{1-x}Sr_xMnO_{3-\delta}$, lanthanum strontium manganite (LSM), $La_{1-x}Sr_xFe_{1-y}Co_yO_{3-d}$ (LSCF), cordierite, $Si_3N_4$, $TiO_2$, talc, MgO, clay, $Al_2O_3$—$ZrO_2$, mullite $Li_2O$—$ZrO_2$—$SiO_2$—$Al_2O_3$ glass ceramic, SiC—$Al_2O_3$—$SiO_2$ composites, calcium phosphate-based composites, $(Ca1_xMg_x)Zr_4(PO_4)$, $La_{0.84}Sr_{0.16}Co_{0.02}MnO_3$, $La_{0.9}Sr_{0.1}Ga_{0.8}Mg_{0.2}O_3$ (LSGM), $La_{0.8}Sr_{0.2}Ga_{0.8}Mg_{0.15}Co_{0.05}O_3$ (LSGMC), $Cr_2O_3$, PZT, $Fe_2O_3La_{0.8}Sr_{0.2}O_{3+x}$, $La_{0.8}Sr_{0.2}Fe_{0.8}Co_{0.2}O_{3-x}$, $Sm_{0.6}Ca_{0.4}CoO_{3-x}$, $SrZrO_3$, Sm-doped $CeO_2$ (SDC), Y-doped $CeO_2$ (YDC), Ni/SDC, NiGr/YSZ, (Ni,M where M=Co,Fe or Cu)/YSZ, praseodymium oxide (PrO$_x$) Ca—$CeO_2$, Y—$CeO_2$, Yttria-stabilised zirconia-terbia (YSZT), $CaFe_xTi_{1-x}O_{3-\delta}$, Ti-doped $NdCrO_3$, $Sc_2O_3$—$Y_2O_3$—$ZrO_2$—$TiO_2$ systems, rutile-type $Ti_{0.97}Nb_{0.03}O_2$, pseudobrookite-type $Mg_{0.3}Nb_{0.1}Ti_{2.6}O_5$ and $MgTi_{1.95}Nb_{0.05}O_5$, pyrochlore-type $Sm_2Ti_{1.9}Nb_{0.1}O_7$ or $V_3O_5$ structure type $CrTi_2O_5$, $SrTiO_3$ doped with La or Nb, $Ba_{0.35}Ca_{0.15}NbO_3$, $Ba_{0.6-x}A_xTi_{0.2}Nb_{0.8}O_3$ where A=Sr, Ca, $La_2Sr_4Ti_6O_{19-\delta}$, $SrTi_{0.97}Nb_{0.03}O_3$, $La_{0.1}Sr_{0.9}TiO_3$ and $La_{0.2}Sr_{0.8}TiO_3$, Yttrium-doped $SrTiO_3$ (YST), (LaA)(CrB)$O_3$ system where A=Ca or Sr and B=Mg, Mn, Fe, Co, Ni, or Ru, $SrFeCo_3O_x$, $SrCo_{0.8}Fe_{0.2}O_3$, $Sr_2GaNbO_6$, tetragonal tungsten bronze type $A_{0.6}B_xNb_{1-x}O_3$ where A=Ba, Sr, Ca, or La and B=Ni, Mg, Mn, Fe, Cr, In, or Sn, $SrCu_{0.4}Nb_{0.6}O_{2.9}$, $SrMn_{0.5}Nb_{0.5}O_{3-\delta}$ or $Sr_2Mn_{0.8}Nb_{1.2}O_6$, pyrochlore $Gd_2(Ti_{1-x}Mo_x)_2O_7$, and any combination thereof.

The polymer precursors used in the subject invention can be a polyisocyanate. Suitable polyisocyanates include diisocyanates and oligomeric adducts of diisocyanates. Liquid polyisocyanates are advantageous in embodiments of the method. Suitable monomeric diisocyanates are represented by the formula R(NCO)$_2$ in which R represents an organic group having a molecular weight of about 56 to 1,000, for example about 84 to 400. The R group is a divalent aliphatic, hydrocarbon group having preferentially from 4 to 12 carbon atoms, a divalent cyclo-aliphatic hydrocarbon group having preferentially from 6 to 13 carbon atoms, a divalent araliphatic hydrocarbon group having preferentially from 7 to 20 carbon atoms or a divalent aromatic hydrocarbon group having 6 to 18 carbon atoms.

Suitable aromatic isocyanates can include but are not limited to: toluene diisocyanate (TDI) as TDI 2,4 and 2,6 isomers (TDI 80/20 80% TDI 2,4 and 20% TDI 2,6 or TDI 65/35 65% TDI 2,4 and 35% TDI 2,6 or 2,4 as a pure isomer), diphenyl-diisocyanate (MDI) as pure MDI, crude MDI or polymeric MDI (PAPI). Suitable aliphatic isocyanates can include but are not limited to: dicyclohexyl diisocyanates (HDI), isophorone diisocyanate (IPDI), 4,4 dicyclohexyl diisocyanate (HMDI).

Suitable organic diisocyanates include 1,4-tetramethylene diisocyanate, 1,6-hexamethylene diisocyanate, 2,2,4-trimethyl-1,6-hexamethylene diisocyanate, 1,12-dodecamethylene diisocyanate, cyclohexane-1,3- and -1,4-diisocyanate, 1-isocyanato-2-isocyanatomethyl cyclopentane, 1-isocyanato-3-isocyanatomethyl-3,5,5-trimethyl-cyclohexane (isophorone diisocyanate or IPDI), bis(4-isocya-natocyclohexyl) methane, 2,4'-dicyclohexylmethane diisocyanate, 1,3- and 1,4-bis(isocyanatomethyl) cyclohexane, bis(4-isocyanato-3-methyl-cyclohexyl) methane, α, α, α', α'-tetramethyl-1,3- and/or -1,4-xylylene diisocyanate, 1-isocyanato-1-methyl-4(3)-isocyanatomethyl cyclohexane, 2,4- and/or 2,6-hexahydrotoluene diisocyanate, 1,3- and/or 1,4-phenylene diisocyanate, 2,4- and/or 2,6-toluene diisocyanate, 2,4'- and/or 4,4'-diphenylmethane diisocyanate, 1,5-diisocyanato naphthalene, 1,6 diisocyanatohexane, 1,5 naphthylene diisocyanate, 1,3 phenylene diisocyanate, 1,1 biphenylene diisocyanate and mixtures thereof. Aromatic polyisocyanates containing 3 or more isocyanate groups such as 4,4',4''-triphenylmethane triisocyanate and polymethylene poly(phenylisocyanates) can be used.

Other polymer precursors that can be combined with polyisocyanates include polyols, polyamines, polycarboxylic acids and polyaminoalcohols including, but not limited to, ethylene glycol, diethylene glycol, 1,4 butanediol, oligopolyols variable between 300-1000 MW which have high functionality 3-8 hydroxylgroup/mol or oligo-polyols of high MW (3000-6500) with low functionality of around 2-3 hydroxyl groups/mol such us polyether polyols, amine polyols, polyester polyols, polytetrahydrofuran polyols, polybutadine, acrylic polyols, diethylenetriamine (DETA), triethylenetetramine, tetraethylenepentamine, polyethyleneimine, glycerol, trimethylolpropane, pentaerythritol, dipentaerythritol, 2,2-bis(4hydroxyphenyl)propane, tolylene-2,4,6-triamine, ethylene diamine (EDA), amino-ethanol, trimethylenediamine, tetramethylenediamine, pentamethylenediamine, hexamethylenediamine, ethanolamine, diethanolamine, hydrazine, triethanolamine, o-toluene diamine (TDA), diphenylmethanediamine (MDA), benzene-1,2,4-tricarboxylic acid, nitrilotriacetic acid, citric acid, and 4,4'-methylenebis(o-chloroaniline). 2,2-bis(4hydroxyphenyl)propane.

Other polymer precursors include organic monomers for chain growth polymerization, such as ammonium acrylate monomers, methylene bisacrylamide (MBAM), methacrylamide (MAM), and poly(ethylene glycol dimethacrylate) (PEGDMA).

As required, other additives such as catalysts, initiators, dispersing agents, binders, pore formers, and/or pigments can also be included.

Suitable catalysts are well known in the polymer chemistry and can include, for example: tertiary amines, such as, N-methylmorpholine, triethylenediamine (TEDA or DABCO), bis (2-dimethylaminoethyl)ether, N,N-dimethylcyclohexylamine, N,N-dimethylethanolamine, N,N-dimethylpropylene diamine; stannous octoate, organotin compounds, such as, dibutyl tin dilaurate (DBTDL); Mannich bases of secondary amines, such as, dimethylamine, and aldehydes, such as, formaldehyde, ketones, such as, acetone, or phenols; organic metal compounds, e.g. organic tin, bismuth, iron, titanium, cobalt, cadmium, or zinc compounds.

Initiators are also well known in the art and can comprise 1,4-diazabicyclooctane and redox pair persulfate-diamine. In one embodiment of the invention, ammonium persulfate (APS) can be used as the free radical initiator and tetramethylethylene diamine (TEMED) can be added to accelerate the polymerization and crosslinking reaction.

Examples of dispersing agents include, but are not limited to, poly(ethylene oxide) (PEO), poly(ethylene glycol) (PEG), poly(vinyl pyrrolidone) (PVP), poly(vinyl alcohol) (PVA), polystyrene (PS), block copolymers of PEO/PS, poly(acrylic acid), poly(methacrylic acid), polyoxyethylene sorbitan oleate, poly(vinyl sulfonic acid), poly(ethylene imine) polypropylene oxide, polybutylene oxide, TWEEN 80, polyoxyethylene (20) sorbitan monooleate.

Binders can comprise at least one type selected from a group consisting of hydroxypropyl methyl cellulose, methyl cellulose, hydroxyethyl cellulose, carboxyl methyl cellulose, polyvinyl alcohol, clot-forming proteins, and ovalbumin.

The pore formers for use in the subject invention can comprise at least one type selected from flour, starch, phenol resin, foam resin, foamed foam resin, polymethyl methacrylate, polyethylene terephthalate, and poly(ethylene glycol) trimethylnonyl ether (e.g., Tergitol TMN10, Fluka Chemie).

METHODS AND MATERIALS

Example 1

Figure 2:
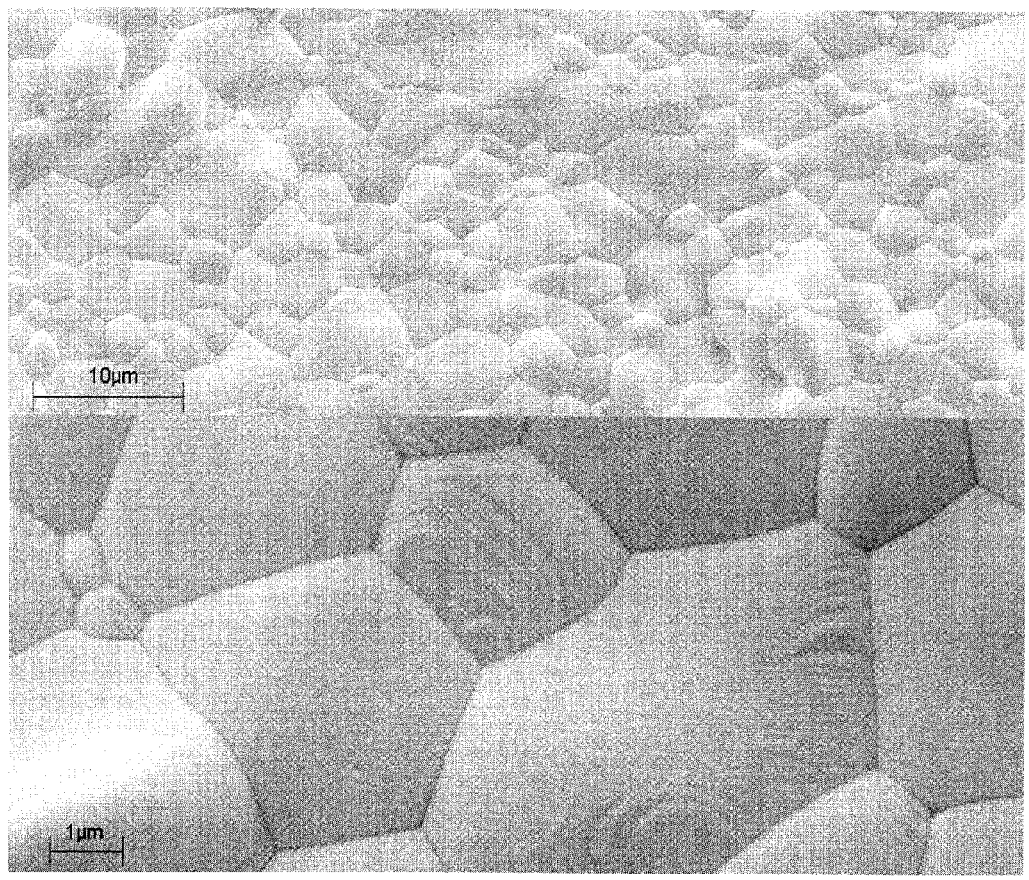
FIG. 2 shows SEM images of the dense surface at two magnifications that indicate the dense surface structure of the well-sintered surface according to an embodiment of the invention.

A ceramic charged polyurethane system was in-situ polymerized on a flat semi-rigid polymeric surface at room temperature. In a first step, 2.25 g of GDC powder was dispersed in 0.8 mL of poly(methylene diisocyanate) then an addition of 0.4 mL of poly(ethylene glycol), 0.1 mL of polyoxyethylene sorbitan monooleate, 1 mg of 1,4-diazabicyclooctane and 10 µL of water was combined with mechanical stirring. A subsequent thermal treatment consisted of the following: a temperature ramp of 1° C. per minute to 600° C., to complete formation and to burn out the polyurethane, a temperature ramp of 2° C. per minute, until 1550° C., a 4 hours dwell at 1550° C. to form the sintered ceramic structure, and a cooling ramp of −2° C. per minute to room temperature. The resulting dual structure ceramic object exhibited an upper dense surface layer without cracks. The dense surface layer was impervious to gasses. FIG. 1 show reproductions of a cut cross-section revealing the dense structure of the top surface layer and the highly porous interior ceramic material. FIG. 2 shows the sintered dense surface of the dual structure ceramic.

All patents, patent applications, provisional applications, and publications referred to or cited herein are incorporated by reference in their entirety, including all figures and tables, to the extent they are not inconsistent with the explicit teachings of this specification.

It should be understood that the examples and embodiments described herein are for illustrative purposes only and that various modifications or changes in light thereof will be suggested to persons skilled in the art and are to be included within the spirit and purview of this application.

We claim:

1. A method for manufacturing a dual structure cellular ceramic object, comprising the steps of:
   forming a fluid dispersion comprising a ceramic precursor and a chain-growth or step-growth organic polymer precursor in a solvent;
   placing said fluid dispersion in a semi-rigid mold or flexible mold or extruding said fluid dispersion through a die to form a shaped object;
   heating said fluid dispersion at a first rate to a first temperature, wherein said first rate is a constant temperature ramp and wherein chain-growth or step-growth organic polymer precursor is converted into a polymer and said polymer is decomposed;
   further heating at a second rate to a second temperature, wherein said second rate is a constant temperature ramp;
   holding said second temperature for a period of time, wherein a sintered dual structure cellular ceramic object is formed, said ceramic object comprising a dense surface layer over at least a portion of said cellular ceramic object adjacent to a porous ceramic structure, wherein said dense surface layer over at least a portion of said cellular ceramic object formed where contact occurred between said shaped object with said semi-rigid mold or flexible mold or said die; and
   cooling said cellular ceramic object to room temperature at a third rate.

2. The method of claim 1, wherein said ceramic precursor comprises alumina, aluminum nitride, boron carbide, ferrites, silicon, silicon carbide, silicon nitride, zinc oxide, cerium oxide (ceria), gadolinia doped ceria (GDC), europium oxide, tin-doped indium oxide, zirconia, yttria-stabilized zirconia (YSZ), NiO—YSZ, $BaTiO_3$, $Nb_2O_5$, CoO, $MnCO_3$, hydroxylapatite, $LaGaO_3$, $La_2Mo_2O_9$, $La_{1-x}Sr_xMnO_{3-\delta}$, lanthanum strontium manganite (LSM), $La_{1-x}Sr_xFe_{1-y}Co_yO_{3-d}$ (LSCF), cordierite, $Si_3N_4$, $TiO_2$, talc, MgO, clay, $Al_2O_3$—$ZrO_2$, mullite, $Li_2O$—$ZrO_2$—$SiO_2$—$Al_2O_3$ glass ceramic, SiC—$Al_2O_3$—$SiO_2$ composites, calcium phosphate-based composites, $(Ca1_xMg_x)Zr_4(PO_4)$, $La_{0.84}Sr_{0.16}Co_{0.02}MnO_3$, $La_{0.9}Sr_{0.1}Ga_{0.8}Mg_{0.2}O_3$ (LSGM), $La_{0.8}Sr_{0.2}Ga_{0.8}Mg_{0.15}Co_{0.05}O_3$ (LSGMC), $Cr_2O_3$, PZT, $Fe_2O_3La_{0.8}Sr_{0.2}O_{3+x}$, $La_{0.8}Sr_{0.2}Fe_{0.8}Co_{0.2}O_{3-x}$, $Sm_{0.6}Ca_{0.4}CoO_{3-x}$, $SrZrO_3$, Sm-doped $CeO_2$ (SDC), Y-doped $CeO_2$ (YDC), Ni/SDC, NiGr/YSZ, (Ni, M where M=Co, Fe or Cu)/YSZ, praseodymium oxide ($PrO_x$), Ca—$CeO_2$, Y—$CeO_2$, Yttria-stabilised zirconia-terbia (YSZT), $CaFe_xTi_{1-x}O_{3-\delta}$, Ti-doped $NdCrO_3$, $Sc_2O_3$—$Y_2O_3$—$ZrO_2$—$TiO_2$ systems, rutile-type $Ti_{0.97}Nb_{0.03}O_2$, pseudobrookite-type $Mg_{0.3}Nb_{0.1}Ti_{2.6}O_5$, $MgTi_{1.95}Nb_{0.05}O_5$ pyrochloretype $Sm_2Ti_{1.9}Nb_{0.1}O_7$, $V_3O_5$ structure type $CrTi_2O_5$, $SrTiO_3$ doped with La or Nb, $Ba_{0.35}Ca_{0.15}NbO_3$, $Ba_{0.6-x}A_xTi_{0.2}Nb_{0.8}O_3$ where A=Sr, Ca, $La_2Sr_4Ti_6O_{19-\delta}$, $SrTi_{0.97}Nb_{0.03}O_3$, $La_{0.1}Sr_{0.9}TiO_3$, $La_{0.2}Sr_{0.8}TiO_3$, Yttrium-doped $SrTiO_3$ (YST), $(LaA)(CrB)O_3$ system where A=Ca or Sr and B=Mg, Mn, Fe, Co, Ni, or Ru, $SrFeCo_3O_x$, $SrCo_{0.8}Fe_{0.2}O_3$, $Sr_2GaNbO_6$, tetragonal tungsten bronze type $A_{0.6}B_xNb_{1-x}O_3$ where A=Ba, Sr, Ca, or La and B=Ni, Mg, Mn, Fe, Cr, In, or Sn, $SrCu_{0.4}Nb_{0.6}O_{2.9}$, $SrMn_{0.5}Nb_{0.5}O_{3-\delta}$, $Sr_2Mn_{0.8}Nb_{1.2}O_6$, pyrochlore $Gd_2(Ti_{1-x}Mo_x)_2O_7$ or any combination thereof.

3. The method of claim 1, wherein said step-growth polymer precursor comprises a polyisocyanate or diisocyanate and a polyol, polyamine, polycarboxylic acid or polyaminoalcohol.

4. The method of claim 1, wherein said ceramic precursor comprises gadolinia doped ceria GDC and said step-growth polymer precursor comprises poly(methylene diisocyanate) and poly(ethylene glycol).

5. The method of claim 1, wherein said dispersion further comprises one or more of catalyst, initiator, dispersing agent, binder, pore former, and pigment.

6. The method of claim 1, wherein said first rate comprises 0.5 K/min to 2 K/min.

7. The method of claim 1, wherein said first temperature comprises 350° C. to 800° C.

8. The method of claim 1, wherein said second rate comprises 0.5 K/min to 4 K/min.

9. The method of claim 1, wherein said second temperature comprises 1100° C. to 1700° C.

10. The method of claim 1, wherein said period of time comprises from no dwell to 10 hours.

11. The method of claim 1, wherein said third rate comprises −0.5 K/min to −4 K/min.

12. The method of claim 1, wherein said mold comprises polystyrene, polyethylene, or polypropylene.

* * * * *